Oct. 15, 1935.  J. SCHERER  2,017,550
SCREW
Filed June 21, 1933
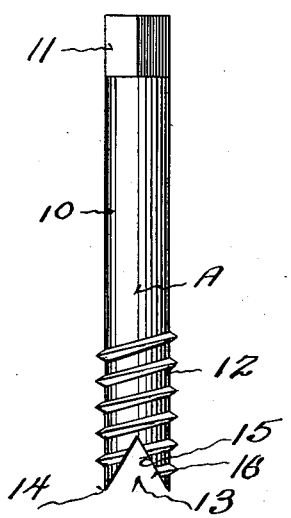
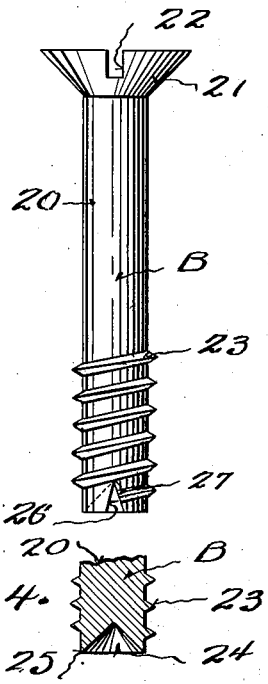
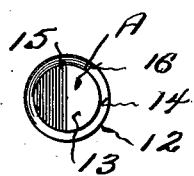
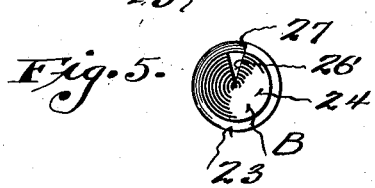

Patented Oct. 15, 1935

2,017,550

UNITED STATES PATENT OFFICE 2,017,550

SCREW

John Scherer, Green Bay, Wis.

Application June 21, 1933, Serial No. 676,843

1 Claim. (Cl. 85—47)

This invention appertains to fastening elements, and more particularly to a novel screw so constructed that the threads thereof will effectively cut their way into the work as the screw is forced into place.

I am conversant with the fact that many attempts have been made to solve the problem of constructing a screw with its thread so formed as to cut its way into the work during rotation thereof, and that patents have been granted on screws of this character (see the Rehse Patent No. 924,273, issued June 8, 1909.) In all of these devices (with which I am familiar) the shank of the screw is provided with longitudinal grooves bisecting the threads. Not only is this type of screw expensive to manufacture, but the same does not give the desired results. Further, none of these screws is successful for use in connection with brittle material, such as tile, brick, etc.

It is therefore one of the salient objects of my invention to provide a screw having the leading end thereof formed in a novel manner, whereby as the screw is forced into the work, the thread will effectively feed and cut its way into the work without danger of chipping the brick or tile.

My screw is of the type commonly known as a "lag" screw, and is adapted to take the place of expansion screws, and the like, and to eliminate the necessity of plugging a bored hole with soft material to receive the screw, the screw being adapted to be fed directly into a bored hole without any treatment thereof.

Another salient object of my invention is the provision of a screw having its leading end provided with cutting faces, and a notch or slot extending through the lowermost convolution of the thread, in such a manner that the leading end of the thread will constitute a cutting face so as to effectively cut into the wall of the bore and form the desired way for receiving the screw-thread.

A further object of my invention is the provision of a screw having its forward end provided with a diametrically extending V-shaped slot, the edges of the slot forming cutting faces and extending through at least one convolution of the thread, so that a cutting face will be formed on the leading end of the thread to engage and cut the work.

A still further object of my invention is to provide an improved screw for use in connection with vitreous material, which will be durable and efficient in use, one that will be simple and easy to manufacture, and one that can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:—

Figure 1 is a side elevation of one form of my improved screw.

Figure 2 is an elevation of the front or leading end of the screw.

Figure 3 is a side elevation illustrating another form of my improved screw.

Figure 4 is a fragmentary longitudinal section through the forward end of that type of screw illustrated in Figure 3.

Figure 5 is an elevation of the front leading end of the screw shown in Figure 3.

Referring to the drawing in detail, wherein similar reference characters designate corresponding parts throughout the several views, the letter A generally indicates one form of my improved screw, which comprises an elongated cylindrical shank 10 of substantially the same diameter throughout its entire length. The outer end of the shank 10 has formed thereon a driving head 11. The head in the present instance is of a polygonal shape in cross section, whereby the same can be conveniently turned by a wrench, brace, or the like. Formed on the shank 10 is a thread 12, and this thread extends to the extreme forward or leading end of the shank.

In accordance with my invention I provide a V-shaped slot 13 in the front end of said shank, and extend this slot diametrically across the front end of the shank. The provision of this V-shaped, diametrically extending slot 13 provides front, sharp, arcuate cutting edges 14 and side cutting edges 15. This slot 13 preferably extends through only one of the convolutions of the thread 12, and at the point where the slot passes through the thread, a sharp leading cutting surface 16 is formed on said thread.

These combinations of faces give the desired sought for results, and in use of my improved screw the usual hole is bored into the tile, brick, or other work, of substantially the same diameter as the shank. The screw is now forced under considerable pressure into the hole with a rotary movement, and the leading sharp end of the screw thread cuts into the bore of the work and allows the easy forming of the way for the screw-thread. The sharp faces of the groove tend to scrape the sides of the bore and carry the cut material forwardly into the bore as the screw is forced into place.

I have found, after numerous experiments, that where longitudinal grooves are formed in the shank of the screw, to provide an interrupted thread, the plurality of thread points along the shank of the screw actually hinder the turning of the screw and tend to mutilate the way being formed in the wall of the bore. This results in undue chipping of the vitreous material, and in the majority of cases actual breakage or cracking results.

In Figures 3 to 5, inclusive, I have illustrated another form of my improved screw, which type of screw is generally indicated by the reference character B. This screw comprises an elongated cylindrical shank 20 of substantially the same diameter throughout its length. The outer end of the screw is provided with a head 21, which can be of the type commonly employed for wood screws, and the same is provided with a diametrically extending slot 22 for receiving the forward end of the driving screw-driver. A thread 23 of the desired type is formed on the shank and extends substantially to the front end of said shank. In accordance with my invention the front end of the shank is provided with an inwardly extending conical depression 24, and the forward edges of the walls of the depression extend to the extreme end of the shank, forming a substantially annular sharp cutting edge 25 at the front end of the screw. A V-shaped radially extending notch 26 is formed in the front end of the shank, and this notch communicates with the interior of the depression 24. This notch 26 extends across the front end of the thread 23 forming a cutting edge 27 thereon.

This type of screw B functions in the same manner as the screw A, and the hole is bored into the work the same size as the diameter of the shank 20. As the screw B is forced in the hole under considerable pressure and turned, the sharp cutting end 27 of the thread will cut its way into the wall of the bore and thus allow the thread to easily follow into the bore.

The sharp cutting edges 25 tend to scrape the sides of the wall bore and carry the material cut by the thread forwardly into the opening or bore.

Obviously any desired or preferred type of head can be formed on the screws, and consequently I do not limit myself to the specific types of heads shown.

From the foregoing description it can be seen that I have provided a novel screw, which will effectively permit the use thereof in vitreous material.

Changes in details may be made without departing from the spirit or scope of my invention, but what I claim as new is:—

In an anchoring screw for vitreous material, an elongated shank having a screw thread on its outer surface extending substantially to the forward end thereof, the leading end of the shank being provided with a conical depression, the walls of the depression extending to the outer front leading end of the shank defining an annular cutting edge, said shank also having a laterally extending notch extending from the inner end of the depression to the outer end of the depression, and communicating with the interior of the depression and extending through the leading end of the thread to form a sharp cutting end thereon, the notch being of an inverted V-shape with its walls diverging from the inner end thereof.

JOHN SCHERER.